United States Patent [19]

Geisthoff

[11] 4,146,246
[45] Mar. 27, 1979

[54] THREE POINT LINKAGE

[75] Inventor: Hubert Geisthoff, Lomar, Fed. Rep. of Germany

[73] Assignee: Jean Walterscheid GmbH, Lohmar, Fed. Rep. of Germany

[21] Appl. No.: 811,707

[22] Filed: Jun. 30, 1977

[30] Foreign Application Priority Data

Aug. 28, 1976 [DE] Fed. Rep. of Germany ....... 2638904

[51] Int. Cl.$^2$ .............................................. A01B 59/06
[52] U.S. Cl. ................................ 280/461 A; 172/275; 172/439; 280/482
[58] Field of Search .......... 280/461 A, 460 A, 456 A, 280/482; 172/439, 448, 449, 272, 275

[56] References Cited

U.S. PATENT DOCUMENTS

| 3,889,980 | 6/1975 | Geistoff ........................... 280/461 A |
| 4,018,451 | 4/1977 | Geistoff et al. ................... 280/461 A |

FOREIGN PATENT DOCUMENTS 7416413 2/1975 Fed. Rep. of Germany.

Primary Examiner—John A. Pekar
Attorney, Agent, or Firm—Toren, McGeady and Stanger

[57] ABSTRACT

A three point linkage for coupling a tractor or similar vehicle to a working tool includes two lower guide members and an upper guide member which is resiliently connected to the lower guide members. A catch hook is located at one end of each of the guide members for coupling to the working tool. The other end of each of the guide members is coupled to the tractor. The upper guide member is longitudinally adjustable and includes an inner guide element telescopically cooperating with a spring loaded outer guide element. A nut, carrying pivotally movable locking jaws, is slidably carried on the outer guide element for fixing the outer guide element relative to the inner guide element. The catch hook of the upper guide member is carried at the opposite end of the outer guide element from the nut. A locking slide is axially displaceable on the outer guide element for locking a coupling bolt on the working machine within the catch hook and also for displacing the sliding nut in response to its contact with the working tool. The locking slide has a first slot and the outer guide element is provided with a lug which has a second slot positioned at an angle with respect to the first slot. A cross-bar passes through both slots so that the locking slide will be displaced when the cross-bar is moved within the slots. Resilient struts connect the cross-bar with the lower guide members to achieve resilient coupling of the upper and lower guide members. Longitudinal displacement of the slide relative to the outer guide element causes displacement of the sliding nut for releasing of the locking jaws and also for opening the catch hook to receive the coupling bolt of the working tool.

8 Claims, 3 Drawing Figures

THREE POINT LINKAGE

BACKGROUND OF THE INVENTION

The present invention relates generally to an arrangement for coupling a working tool or piece of equipment, such as farm equipment, to a vehicle, such as an agricultural tractor. More particularly, the invention is directed to a coupling of the three point linkage type consisting of an upper guide member and two lower guide members which resiliently support the upper guide member. The upper guide member includes a pair of spring loaded telescopically cooperating guide elements for extension of the upper guide member. Locking jaws are provided for fixing the relative positions of the guide elements with respect to each other and a catch hook is carried at one end of the outer guide element for attachment to the working tool.

Three point linkages of a variety of types are known in the art for connecting various types of farm equipment and working tools to an agricultural tractor. The known three point linkages, however, are either difficult to manipulate in the coupling and uncoupling operation or there are disadvantages such as being unduly complicated.

One such three point linkage presently known and typical of the prior art is shown and described in German GM 7 416 431. This three point linkage has an upper guide member having an outer guide end portion, with the housing of a locking mechanism containing pivotally mounted locking jaws carried on the opposite end of the guide member. The locking jaws are annularly shaped and spring loaded so as to be urged into the annular grooves of an inner guide element to fix the longitudinal position of the upper guide member. The locking jaws are released by manipulation of guidebolts which are actuated by means of a lever. A compression spring is provided within the upper guide member for rapid length adjustment in the direction of maximum length extension. This upper guide member is supported on a resilient frame of the three point linkage to which it is articulately connected.

This type of known three point linkage has the disadvantage that the tractor driver must simultaneously watch the position of the upper catch hook, actuate a switch gear, drive the tractor, and also operate a cable for adjusting the longitudinal position of the upper guide when effecting the coupling of the tractor to a working tool. To disconnect or uncouple the working tool from the tractor, the driver must, in addition, actuate a mechanism for releasing the locking devices on the catch hooks of both the upper and lower guides.

Accordingly, it is the objective of the present invention to provide a three point linkage for facilitating and simplifying the coupling and uncoupling of a working tool with a vehicle, such as a farm tractor.

More specifically, it is an object of the present invention to provide a three point linkage which will immobilize or fix the upper guide member in its longitudinally adjusted position and lock the catch hook of the upper guide member automatically during the coupling and uncoupling maneuvers involved in attaching a working tool to a vehicle, such as a tractor.

The above objects, features and advantages, along with other objects, features and advantages of the present invention will become more apparent from the detailed description of the invention, in conjunction with the accompanying drawings to be described more fully hereinafter.

SUMMARY OF THE INVENTION

These objects of the present invention are generally accomplished by providing a three point linkage for attaching a working tool to a vehicle which includes two lower guide members and an upper guide member resiliently connected with the lower guide members. Each of the guide members has a catch hook at one end for attachment to the working machine with means at the other end for coupling to the vehicle. The upper guide member is longitudinally adjustable in length and comprises an inner guide element telescopically cooperating with a spring loaded outer guide element. A nut is supported on the outer guide element for sliding movement therealong carrying pivotally movable locking jaws for fixing the relative position of the outer guide element to the inner guide element. A locking slide member is axially slidable on the outer guide element for locking a coupling bolt on the working tool within a catch hook on the upper guide member and for causing displacement of the sliding nut to actuate the locking jaws. The locking slide has a first slot, and means fixed to the outer guide element has a second slot the longitudinal axis of which is at an angle to the longitudinal axis of the first slot. A cross-bar extends through the first and second slots so that the locking slide is displaced with respect to the outer guide element when the cross-bar is displaced in the slots. Resilient struts are connected at one end to the lower guide members and at the other end to the cross-bar for resiliently coupling the lower guide members to the upper guide member. The locking slide is adapted for longitudinal displacement with respect to the outer guide element for effecting displacement of the sliding nut and for opening the upper guide member catch hook so that the hook can receive the coupling bolt of the working machine when the locking slide is engaged by the coupling bolt of the working tool.

The advantage of the three point linkage according to the present invention is that the length adjustment of the upper guide, as well as locking of the catch hook on the upper guide is automatically accomplished without any manual assistance from the driver or another person. Also, while in use, the length of the upper guide can be adjusted by means of the sliding nut which carries the locking jaws.

A further feature of the present invention is that the outer guide element carries two or more elongated slots forming guideways for carrying the locking slide so that it can be displaced with respect to the outer guide element.

According to yet a further feature of the present invention, one end of the locking slide has a catch formed with a hollow throat having a center located above the upper edge of the locking slide to prevent the coupling bolt of the working tool from prematurely engaging in the open mouth of the catch hook on the upper guide member which would cause premature displacement of the locking slide into the locked or closed position.

A preferred embodiment of the present invention will be diagrammatically illustrated with reference to the following drawings annexed hereto.

DESCRIPTION OF THE INVENTION

Figure 2:
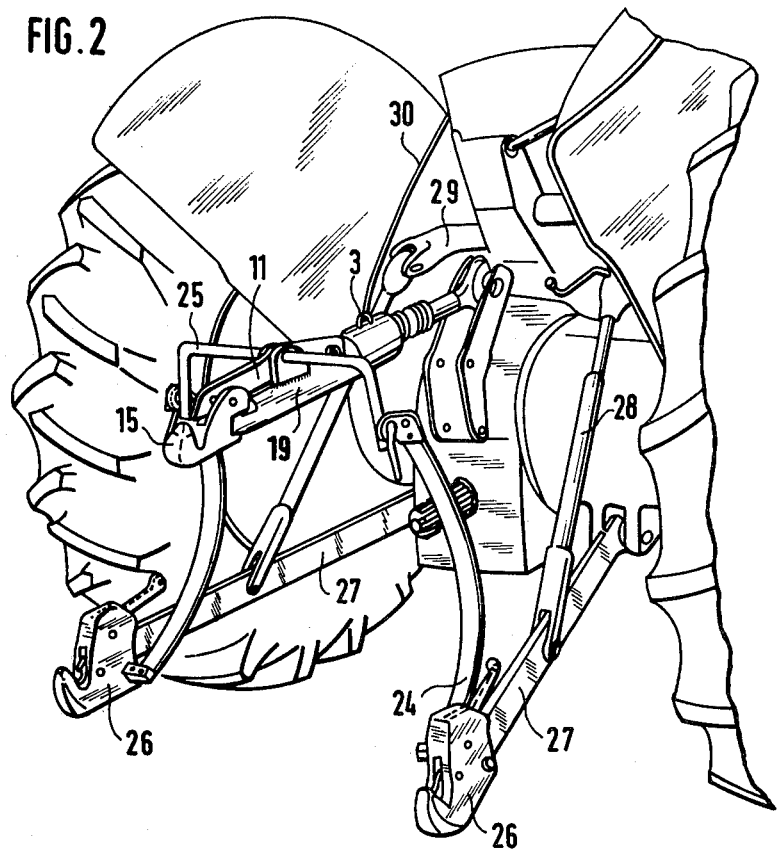
FIG. 2. is a rear perspective view partially showing a tractor having the three point linkage according to the present invention coupled therewith.

In the drawings and with particular reference to FIG. 2, the three point linkage of the present invention includes two lower guide members 27 attached at one end to the tractor and carrying catch hooks 26 at the other end. An upper guide member 19 is supported on the lower guide members 27 by resilient struts 24. One end of the upper guide member is attached to the tractor and its other end has a catch hook 15.

Figure 1:
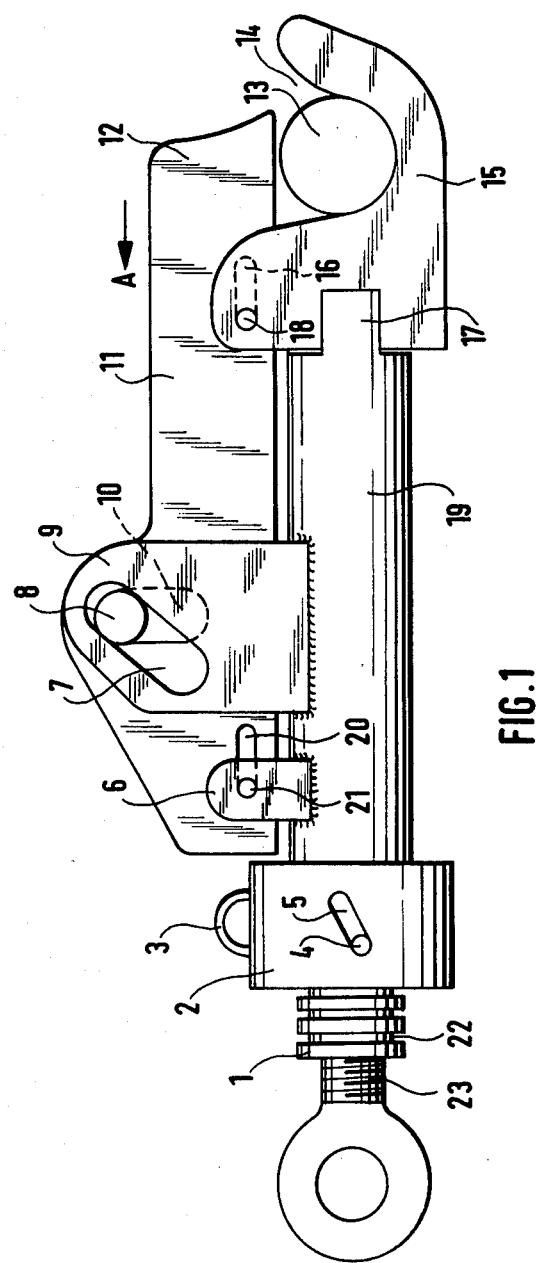
FIG. 1 is a side view showing the upper guide member according to the present invention.
Figure 3:
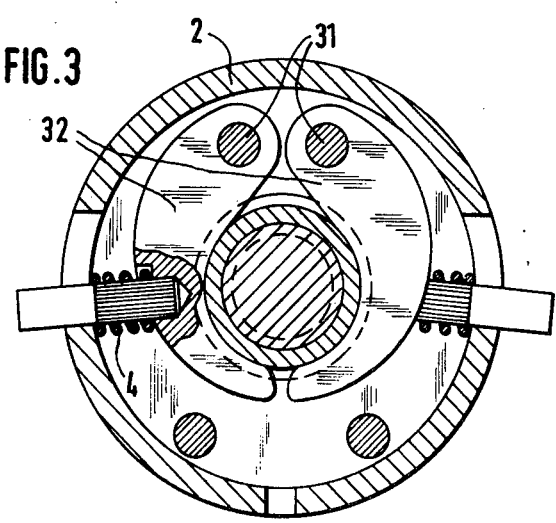
FIG. 3 is a sectional view taken through the sliding nut of the present invention showing the locking jaws.

The upper guide member 19 is shown in greater detail in FIG. 1 and includes an inner guide element 1 telescopically carried within the upper guide member 19 which is spring loaded by a compression spring (not shown) carried within it and urging the telescopically arranged guide element into an extended position. At its outer end the inner guide element 1 has a coupling head from which a threaded spindle 23 extends. The spindle is threaded into an annularly grooved spindle 22 to afford fine adjustment in the length of the upper guide member. The upper guide member 19 carries a sliding nut 2 for displacement in the longitudinal direction. FIG. 3, which is a cross-sectional view taken through nut 2 in a direction transverse to its longitudinal axis, illustrates locking jaws 32 mounted for pivotal movement about bearing pins 31, for engaging the grooves of the spindle 22 for fixing the relative position of the inner guide element in the upper guide member 19.

The sliding nut 2 is resiliently connected with the outer guide element 19 by spring loaded pins 4. Pins 4 extend through cooperating slots 5 permitting axial displacement of the nut 2 in the direction of arrow A. Locking engagement of the inner guide element 1 within the upper member 19 is released by actuating the sliding jaws 32 within the locking nut 2 as a result of axial displacement of the nut. Axial displacement of the sliding nut 2 is accomplished by applying tension to cable 30 attached to an eye 3 on the sliding nut 2, or automatically as a result of the action of a locking slide 11, such action is described more fully hereinafter. When the locking engagement of these telescoping parts is released, the upper guide member, as a result of action of the compression spring within the upper guide member 19, will tend to expand to its maximum length, or will continue to expand longitudinally until the locking jaws are re-engaged for locking or fixing the inner guide element in the upper guide member 19. The maximum length of the upper guide member is used as the starting point for the automatic coupling maneuver.

The locking slide 11 is mounted for longitudinal sliding movement on the upper guide member 19 by means of two longitudinal slots 16 and 20 in the slide and cooperating bolts 18 and 21. Bolt 21 is secured to a supporting lug 6 on the upper guide and bolt 18 is secured to the catch hook 15.

A slot 10 is formed in the locking slide 11 and has its longitudinal axis extending in a direction perpendicular to the longitudinal axis of the upper guide member. Another slot 7 is formed in a lug 9 which is secured to the upper guide member. The slot 7 has its longitudinal axis extending at an angle with respect to the longitudinal axis of slot 10. Slot 7 is fixed in its position with respect to the guide member while slot 10, being carried on the movable locking slide 11, is displaceable with respect to the slot 7. While FIG. 1 shows only one such lug 9 positioned on one side of the locking slide 11, it will be appreciated, particularly from FIG. 2, that a second lug 9 is positioned on the other side of locking slide 11 so that the upstanding lugs 9 will form a passage guideway therebetween for supporting the locking slide 11. Both of the lugs 9 are provided with a slot 7. A cross-bar shown in the side view of FIG. 1 as reference numeral 8, and more fully shown in the perspective view of FIG. 2 as reference numeral 25, extends in a direction transverse to the longitudinal axis of the upper guide member through slots 7 in each of the lugs 9 and through the slot 10 in the locking guide 11. The opposite ends of the cross-bar 25 are bent downwardly and connected with the upper ends of the resilient struts 24, the lower ends of which are connected with the lower guide members 27. In this manner, the lower guide members 27 of the linkage cooperate with and cause reaction in the locking slide 11.

While coupling a working tool with the tractor, the lower guides 27 are vertically adjustable so that the locking slide 11 can be raised, as a result of the connection with the lower guides through resilient struts 24 and cross-bar 25, until it reaches a height corresponding to an upper coupling bolt 13 provided on the working tool to be attached to the tractor. The end 12 of the locking slide 11 forms a catch which cooperates with the catch hook 15 for locking the bolt 13 therein when the catch end 12 of the locking slide is in the extended position shown in FIG. 1. The locking end 12 is shaped to provide a hollow throat portion with its lower end protruding over the opening of the catch hook. In this manner the end of the locking slide 11 forms a guide for the coupling bolt 13.

This particular form of locking end 12 prevents the coupling bolt 13 from prematurely slipping into the catch hook opening 14 and becoming immobilized or locked therein before the catch hooks of the lower guides 27 have reached the correct position for engagement with lower coupling bolts on the working tool.

The three point linkage operates in the following manner to accomplish a coupling maneuver with a working tool. First, the tractor is operated in reverse so that it moves toward a working tool. As the tractor moves toward the working tool the upper coupling bolt 13 on the working tool engages the locking end 12 and displaces the locking slide 11 in the direction of arrow A. As a result, the opposite end of locking slide 11 engages and displaces the sliding nut 2 also in the direction of arrow A thus unlocking or releasing the locking jaws 32 from the groove 22 and allowing the outer guide element 19 to extend with respect to the telescopically arranged inner guide element 1. This causes the entire upper guide member 19 to move backwardly in a direction opposite to that of arrow A until the catch hooks 26 of the lower guide members 27 are in position beneath lower coupling bolts of the working machine. When the catch hooks 26 are in this position the lower guide members 27 are raised and the lower coupling bolts of the working tool drop into the openings of the lower catch hooks 26 which close to secure the coupling bolts. As a result of raising the lower guide members 27, the resilient struts 24 and cross-bar 25 lift the upper guide member and the upper coupling bolt 13 of the working tool then slips into the catch hook opening 14. The raising action of the lower guide members 27 causes the resilient struts 24 to push the cross-bar 25 in an upward direction so that while it rides upwardly in slot 10 it also upwardly and at an angle in slots 7 thus displacing the locking slide 11 in the direction opposite to the direction of arrow A with the locking end 12 closing or locking the catch hook 15. Simultaneously, the sliding nut 2 is released and the locking jaws reengage with one of the grooves on the spindle 22 to fix the relative position of the inner guide element 1 in the upper guide member 19. Thus, the coupling maneuver is completed with the locking operation accomplished automatically.

To uncouple or disconnect the working tool from the tractor, the lower catch hooks carried at the ends of the lower guide members 27 are opened through the use of traction cables and the lower guide members drop away from the lower coupling bolts of the working machine. As a result, the resilient struts 24 and cross-bar 25 cause the cross-bar extending through the angularly disposed slots 7 and 10 to displace the locking slide 11 in the direction of arrow A. This results in the further displacement of the sliding nut 2 thus extending the upper guide member due to the release of the inner guide element within the upper guide member so that the catch hook 15 will be opened allowing release of the upper coupling bolt 13.

It will be appreciated from the foregoing that a novel three point linkage arrangement has been provided for accomplishing coupling of a working tool or other piece of equipment to a tractor or other vehicle in a simple and relatively automatic manner.

As can be appreciated the three point linkage can be mounted on the front as well as the rear of the tractor or other vehicle.

While the invention has been described and illustrated with respect to certain embodiments which produce satisfactory results, it will be understood by those skilled in the art, after understanding the purposes of the invention that various other changes and modifications may be made without departing from the spirit and scope of the invention, and it is therefore intended in the appended claims to cover all such changes and modifications.

What is claimed is:

1. A three point linkage for attaching a working tool to a vehicle comprising two lower guide members an upper member, and means for connecting said upper member to said two lower guide members, each of said upper and lower guide members having a catch hook at one end thereof for attachment to the working tool, said upper guide member being longitudinally adjustable and comprising an inner guide element telescopically cooperating with a spring loaded outer guide element, a sliding nut supported on said outer guide element, pivotally movable locking jaws supported in said sliding nut for locking said outer guide element and said locking jaws being displaceable on said outer guide element for fixing the relative position of said outer guide element with respect to said inner guide element, means in said sliding nut for biasing said locking jaws into locking engagement with said inner guide element and said biasing means being displaceable in response to axial movement of said sliding nut for releasing the locking engagement of said locking jaws, said upper guide member catch hook being carried at one end of said guide element, an elongated locking slide member axially slidable on said outer guide element for locking at one end a coupling bolt of the working tool within said upper guide member catch hook and for causing at the other end displacement of said sliding nut, said locking slide having a first slot, means secured to said outer guide element having a second slot the longitudinal axis of which is at an angle to the longitudinal axis of said first slot, a cross-bar extending through said first and second slots so that said locking slide will be displaced with respect to said outer guide element when said cross-bar is displaced in said slots, said means for connecting said upper guide member to said lower guide members comprises resilient struts connected at one end thereof to said lower guide members and at the other end thereof to said cross-bar for resiliently coupling said lower guide members to said upper guide member, and said locking slide being adapted for longitudinal displacement with respect to said outer guide element to displace said sliding nut and for opening said upper guide member catch hook to receive the coupling bolt of the working tool when said locking slide is engaged by the coupling bolt during a coupling operation.

2. A three point linkage according to claim 1 further comprising guideways formed in said outer guide element for retaining and guiding said locking slide, said guideways comprising at least two elongated slots.

3. The three point linkage according to claim 1 wherein said locking slide is provided with a locking catch at the one end thereof, said locking catch having a hollow throat in the end surface of the one end thereof with the lower end of the hollow throat protruding outwardly.

4. A three point linkage for attaching a working tool to a vehicle comprising an upper guide member and a pair of lower guide members, means connecting said upper guide member to each of said lower guide members, each of said guide members having catch means at one end thereof for releasable connection to the working tool, said upper guide member comprising telescopically cooperating guide elements, means for urging said guide elements into an extended position, releasable locking means carried by said elements for releasably holding one of said guide elements in a fixed position with respect to the other guide element, an actuating member carried on said upper guide member for longitudinal sliding movement between a first position and a second position, means carried at one end of said actuating member for opening and closing said catch means and adapted for engagement by the working tool to effect displacement of said actuating member in a first direction away from said catch means toward the opposite end of said guide member for movement thereof from the first position to the second position, said releaseable locking means located in the path of said actuating member as it moves from the first position to its second position whereby in movement into the second position said actuating member will engage and release said locking means to allow extension of said guide elements and to effect opening of said catch means at the end of said upper guide member for attachment to the working tool when said actuating member is displaced in said first direction, and means carried by said actuating member cooperating with said means connecting said upper guide member to each of said lower guide members for displacing said actuating member in response to movement of said lower guide members.

5. A three point linkage according to claim 4 wherein said means cooperating with said connecting means to said lower guide members comprises a first slot carried by said actuating member, means secured to said outer guide element having a second slot the longitudinal axis of which is at an angle to the longitudinal axis of said first slot, and said connecting means including a cross-bar extending through said first and second slots to effect longitudinal displacement of said actuating member when said cross-bar is displaced in said slots, and wherein said connecting means also includes resilient struts connected to one end thereof to said lower guide members and connected at the other end thereof to said cross-bar for resiliently coupling said lower guide members to said upper guide member.

6. A three point linkage according to claim 5 wherein said locking means comprises a displaceable nut supported on one of said telescopically cooperating guide elements for sliding movement therealong, and pivotally movable locking jaws supported by said sliding nut and actuatable by displacement thereof for fixing the relative position of said telescopically cooperating guide elements.

7. A three point linkage according to claim 6 wherein said actuating member comprises a slide element slidably supported on one of said telescopically cooperating guide elements, and further comprising guideways formed in the one of said guide elements for retaining and guiding said slide therein.

8. A three point linkage according to claim 7 wherein said catch means carried at said one end of said actuating member being formed by said slide element and said slide element having a hollow throat in the end surface thereof directed toward the working tool with the lower end of said hollow throat protruding outwardly.

* * * * *

UNITED STATES PATENT OFFICE
CERTIFICATE OF CORRECTION

Patent No. 4,146,246   Dated   March 27, 1979

Inventor(s)  Hubert Geisthoff

It is certified that error appears in the above-identified patent and that said Letters Patent are hereby corrected as shown below:

In the specification Column 5, line 4 should read as follows:

After "also" insert -- rides --.

Signed and Sealed this

*Twenty-first* Day of *August 1979*

[SEAL]

*Attest:*

LUTRELLE F. PARKER
*Attesting Officer*   *Acting Commissioner of Patents and Trademarks*